United States Patent
Shah et al.

(10) Patent No.: US 8,000,313 B1
(45) Date of Patent: Aug. 16, 2011

(54) METHOD AND SYSTEM FOR REDUCING COMMUNICATION SESSION ESTABLISHMENT LATENCY

(75) Inventors: Maulik K. Shah, Overland Park, KS (US); Jasinder P. Singh, Olathe, KS (US); Anthony K. Leung, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 576 days.

(21) Appl. No.: 12/192,217

(22) Filed: Aug. 15, 2008

(51) Int. Cl.
*H04J 3/06* (2006.01)

(52) U.S. Cl. .................... 370/350; 370/252; 370/496

(58) Field of Classification Search .................. 370/252, 370/350, 496
See application file for complete search history.

(56) References Cited

U.S. PATENT DOCUMENTS

| | | |
|---|---|---|
| 4,870,408 A | 9/1989 | Zdunek et al. |
| 5,442,809 A | 8/1995 | Diaz et al. |
| 5,568,511 A | 10/1996 | Lampe |
| 5,710,591 A | 1/1998 | Bruno et al. |
| 5,752,202 A | 5/1998 | Obright |
| 5,818,836 A | 10/1998 | DuVal |
| 5,850,611 A | 12/1998 | Krebs |
| 5,884,196 A | 3/1999 | Lekven et al. |
| 5,936,964 A | 8/1999 | Valko et al. |
| 5,983,099 A | 11/1999 | Yao et al. |
| 6,014,556 A | 1/2000 | Bhatia et al. |
| 6,032,051 A | 2/2000 | Hall et al. |
| 6,041,241 A | 3/2000 | Willey |
| 6,119,017 A | 9/2000 | Cassidy et al. |
| 6,178,323 B1 | 1/2001 | Nagata |
| 6,289,054 B1 | 9/2001 | Rhee |
| 6,317,595 B1 | 11/2001 | St. John et al. |
| 6,381,467 B1 | 4/2002 | Hill et al. |
| 6,477,150 B1 | 11/2002 | Maggenti et al. |
| 6,490,452 B1 | 12/2002 | Boscovic et al. |
| 6,526,377 B1 | 2/2003 | Bubb |
| 6,564,049 B1 | 5/2003 | Dailey |
| 6,590,885 B1 | 7/2003 | Jorgensen |
| 6,668,167 B2 | 12/2003 | McDowell et al. |
| 6,757,245 B1 | 6/2004 | Kuusinen et al. |
| 6,865,398 B2 | 3/2005 | Mangal et al. |
| 7,020,098 B2 | 3/2006 | Ehrsam et al. |

(Continued)

FOREIGN PATENT DOCUMENTS

EP 0 817 457 1/1998

(Continued)

OTHER PUBLICATIONS

U.S. Appl. No. 10/277,465, filed Oct. 22, 2002.

(Continued)

*Primary Examiner* — Phuc Tran

(57) ABSTRACT

Methods and systems for reducing communication session establishment latency are introduced. In a wireless communication network, a radio access network (RAN) determines that a wireless communication device (WCD), such as a mobile phone, is attempting to establish a communication session. Based on the quality-of-service sensitivity of the communication session as well as recent reports of wireless coverage quality received from the WCD, the RAN selects an appropriate timeout value. This selected timeout value is used for a timer associated with a communication session establishment message transmitted by the RAN to the WCD. As a result, the RAN can retransmit the communication session establishment message rapidly in situations where the communication session establishment message is more likely to be lost.

20 Claims, 8 Drawing Sheets

U.S. PATENT DOCUMENTS

| | | | |
|---|---|---|---|
| 7,043,266 B2 | 5/2006 | Chaturvedi et al. | |
| 7,099,291 B2 | 8/2006 | Harris et al. | |
| 7,099,629 B1 | 8/2006 | Bender | |
| 7,292,825 B2 | 11/2007 | Beale et al. | |
| 2002/0034166 A1 | 3/2002 | Barany et al. | |
| 2002/0034941 A1 | 3/2002 | Patil et al. | |
| 2002/0055364 A1 | 5/2002 | Wang et al. | |
| 2002/0058523 A1 | 5/2002 | Maggenti et al. | |
| 2002/0071445 A1 | 6/2002 | Wu et al. | |
| 2002/0145990 A1 | 10/2002 | Sayeedi | |
| 2002/0147818 A1 | 10/2002 | Wengrovitz | |
| 2002/0167905 A1* | 11/2002 | Wenzel et al. | 370/249 |
| 2002/0172165 A1 | 11/2002 | Rosen et al. | |
| 2002/0172169 A1 | 11/2002 | Rosen et al. | |
| 2002/0173308 A1 | 11/2002 | Dorenbosch et al. | |
| 2002/0173325 A1 | 11/2002 | Rosen et al. | |
| 2002/0173326 A1 | 11/2002 | Rosen et al. | |
| 2002/0173327 A1 | 11/2002 | Rosen et al. | |
| 2002/0177461 A1 | 11/2002 | Rosen et al. | |
| 2002/0191583 A1 | 12/2002 | Harris et al. | |
| 2002/0198008 A1 | 12/2002 | Smith et al. | |
| 2003/0008657 A1 | 1/2003 | Rosen et al. | |
| 2003/0021264 A1 | 1/2003 | Zhakov et al. | |
| 2003/0032448 A1 | 2/2003 | Bulthuis et al. | |
| 2003/0083045 A1 | 5/2003 | Blight et al. | |
| 2003/0097447 A1 | 5/2003 | Johnston | |
| 2003/0100326 A1 | 5/2003 | Grube et al. | |
| 2003/0114156 A1 | 6/2003 | Kinnavy | |
| 2003/0114174 A1 | 6/2003 | Walsh et al. | |
| 2003/0119540 A1 | 6/2003 | Mathis | |
| 2003/0125062 A1 | 7/2003 | Bethards et al. | |
| 2003/0190888 A1 | 10/2003 | Mangal et al. | |
| 2004/0014456 A1 | 1/2004 | Vaananen | |
| 2004/0032843 A1 | 2/2004 | Schaefer et al. | |
| 2004/0121791 A1 | 6/2004 | May et al. | |
| 2004/0151158 A1 | 8/2004 | Gannage et al. | |
| 2007/0288824 A1* | 12/2007 | Yeo et al. | 714/749 |
| 2008/0031224 A1 | 2/2008 | Nanda et al. | |
| 2008/0089272 A1* | 4/2008 | Ahokangas | 370/328 |
| 2009/0036109 A1* | 2/2009 | Shintani | 455/418 |
| 2010/0317345 A1* | 12/2010 | Futaki et al. | 455/436 |

FOREIGN PATENT DOCUMENTS

| | | |
|---|---|---|
| EP | 0 984 608 | 3/2000 |

OTHER PUBLICATIONS

Bill Douskalis, "IP Telephone—The Integration of Robust VoIP Services," Section 1.3, pp. 36-69, Prentice Hall PTR, 2000.

3G, 3$^{rd}$ Generation Partnership Project 2 "3GPP2", "Fast Call Set-Up," Version 1.0, Apr. 15, 2002.

Mobile Tornado, "Add Two-Way VoIP Services. To Mobile Networks and Devices. Today," http://www.mobiletornado.com/products_iprsptt.html, printed from the World Wide Web on Jan. 27, 2003.

"Qualcomm Chats Up 'Push-to-Talk'," http://siliconvalley.internet.com/news/print.php/ 953261, printed from the World Wide Web on Jan. 27, 2003.

International Search Report from International Application No. PCT/US02/31411, dated Mar. 4, 2003.

International Search Report from International Application No. PCT/US02/29575, dated Dec. 10, 2002.

International Search Report from International Application No. PCT/US02/36055, dated Apr. 10, 2003.

International Search Report from International Application No. PCT/US03/03021, dated Jun. 18, 2003.

International Search Report from International Application No. PCT/US03/02950, dated Nov. 6, 2003.

Schulzrinne and Rosenberg, "SIP Caller Preferences and Callee Capabilities," Internet Engineering Task Force, Internet Draft, Oct. 22, 1999.

Vakil et al., "Host Mobility Management Protocol Extending SIP to 3G-IP Networks," Internet Engineering Task Force, Internet Draft, Oct. 1999.

Campbell and Sparks, "Control of Service Context Using SIP Request—URI" Network Working Group, Apr. 2001.

Ericsson, wvvvv.telecomcorridor.com/wireless%20horizons/1Coyne.pdf, printed from the World Wide Web on Jun. 27, 2001.

Dirk Kutscher/Jorg Ott, "The Message Bus—A Communication & Integration Infrastructure for Component-Based Systems," White Paper, Jan. 2000.

Ott et al., "A Message Bus for Local Coordination," Network Working Group, Internet-Draft, May 30, 2001.

TR45, Medium Access Control (MAC) Standard for cdma2000 Spread Spectrum Systems, IS-2000-3, Jul. 12, 1999.

3$^{rd}$ Generation Partnership project 2 '3GPP2', "Interoperability Specification (I0S) for CDMA 2000 Access Network Interfaces—part 3 Features," Nov. 2001.

Perkins, "IP Mobility Support," Internet Engineering Task Force Request for Comment 2002, Oct. 1996.

Perkins, "IP Encapsulation within IP," Internet Engineering Task Force Request for Comments 2003, Oct. 1996.

Perkins, "Minimal Encapsulation within IP," Internet Engineering Task Force Request for Comments 2004, Oct. 1996.

Solomon, "Applicability Statement for IP Mobility Support," Internet Engineering Task Force Request for Comments 2005, Oct. 1996.

Handley et al., "SDP: Session Description Protocol," Internet Engineering Task Force Request for Comment 2327, Apr. 1998.

Handley et al., "SIP: Session Initiation Protocol," Internet Engineering Task Force Request for Comment 2543, Mar. 1999.

Fielding et al., "Hypertext Transfer Protocol—HTTP/1.1," Internet Engineering Task Force Request for Comment 2616, Jun. 1999.

Rigney et al., "Remot Authentication Dial in User Service (RADIUS)," Internet Engineering Task Force Request for Comment 2865, Jun. 2000.

Rigney, "RADIUS Accounting," Internet Engineering Task Force Request for Comment 2866, Jun. 2000.

OMA, "Discussion and definitions on PoC Floor Control," Input Contribution, Doc #OMA-REQ-2003-0375-PoC_Floor_Control, Jun. 2, 2003.

OMA, PoC Use case: Mobile—PC Example, Input contribution, Doc #OMA-REQ-2003-0323 PoC Mobile-PC use case, May 5, 2003.

OMA, "PoC Use case: Multimedia Group Call Example," Input Contribution, Doc #OMA-REQ-2003-0306-PoC UseCase-group-multimedia-scenario, May 6, 2003.

OMA, "PoC Use case: Examples of User Requirements," Input Contribution, Doc #OMA-REQ-2003-0305-PoC Use Case, May 6, 2003.

OMA, "Inputs for PoC Requirements Document," Input Contribution, Doc #OMA-REQ-2003-0367-PoC_Input-Motorola, May 29, 2003.

OMA, "Push to Talk over Cellular (PoC)," Version: 0.1.6, May 12, 2003.

Qualcomm, "Dispatch Services on cdma2000," May 11, 2001.

\* cited by examiner

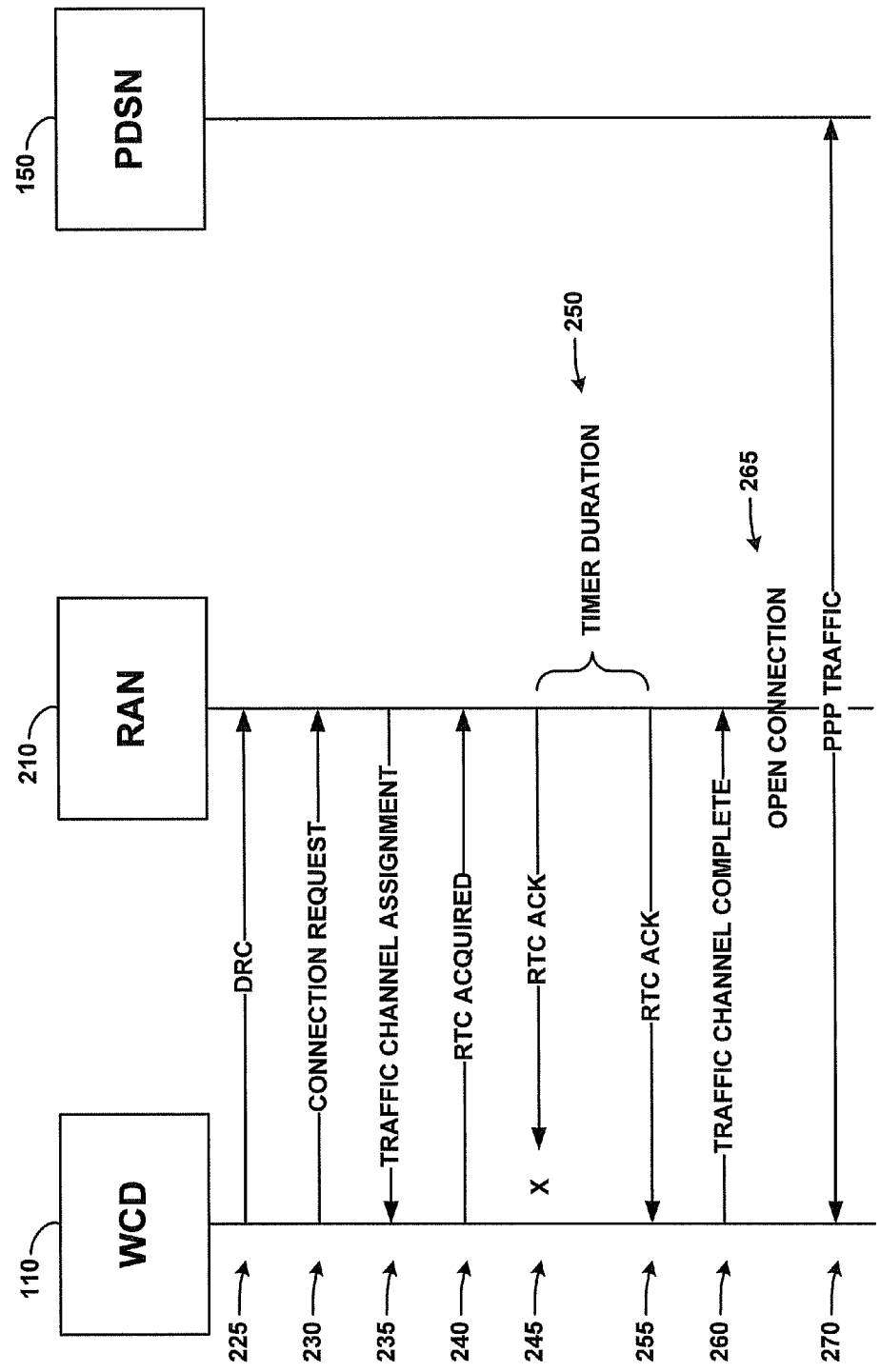

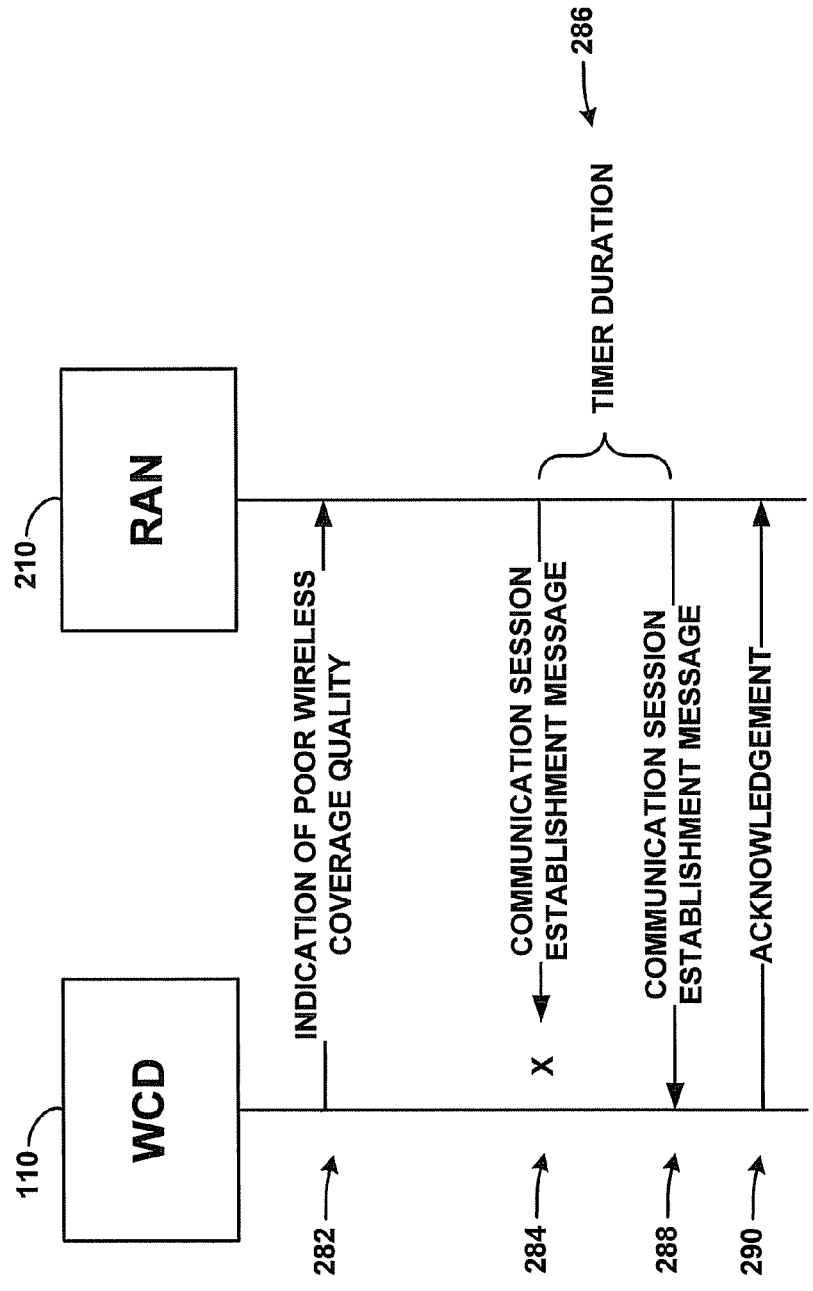

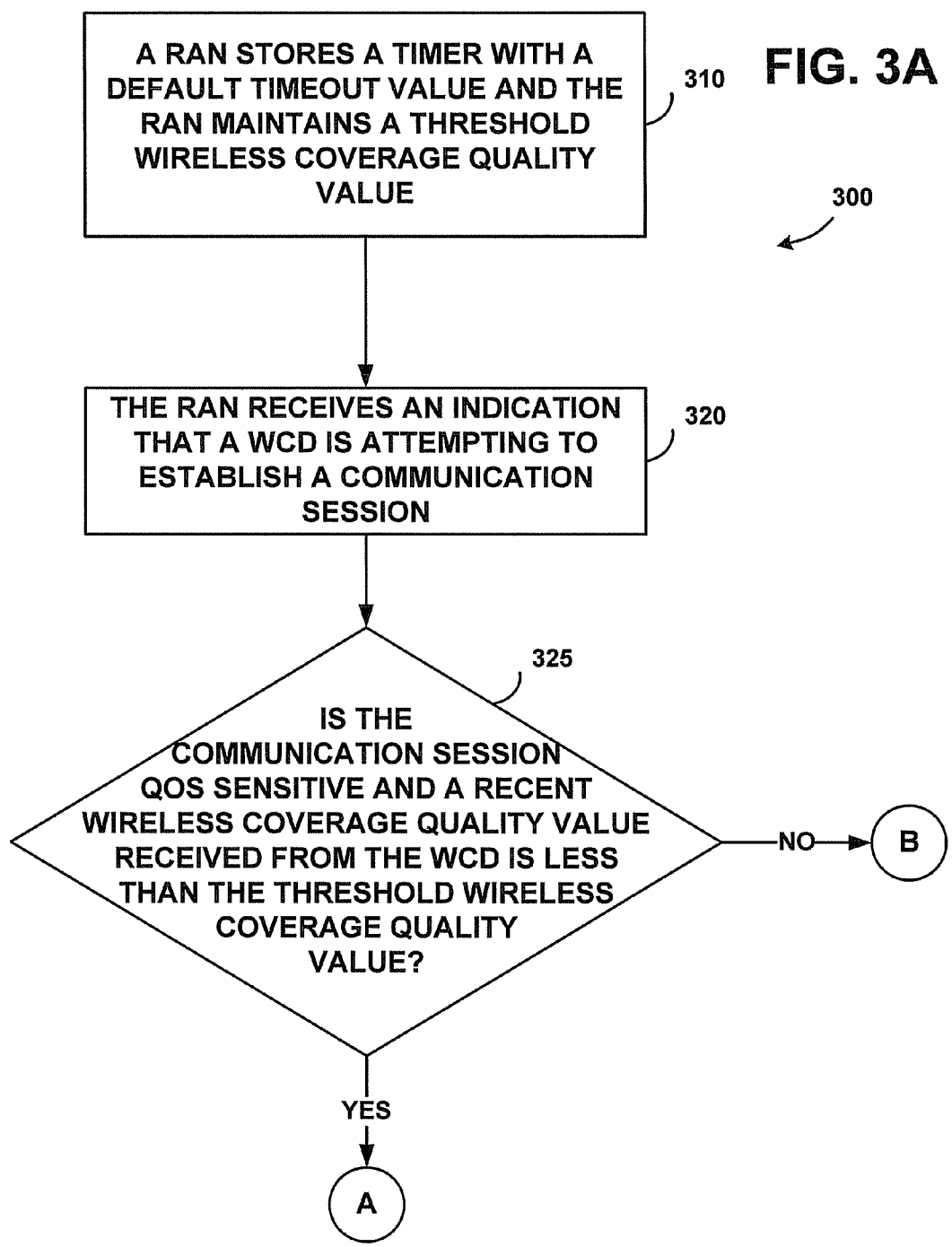

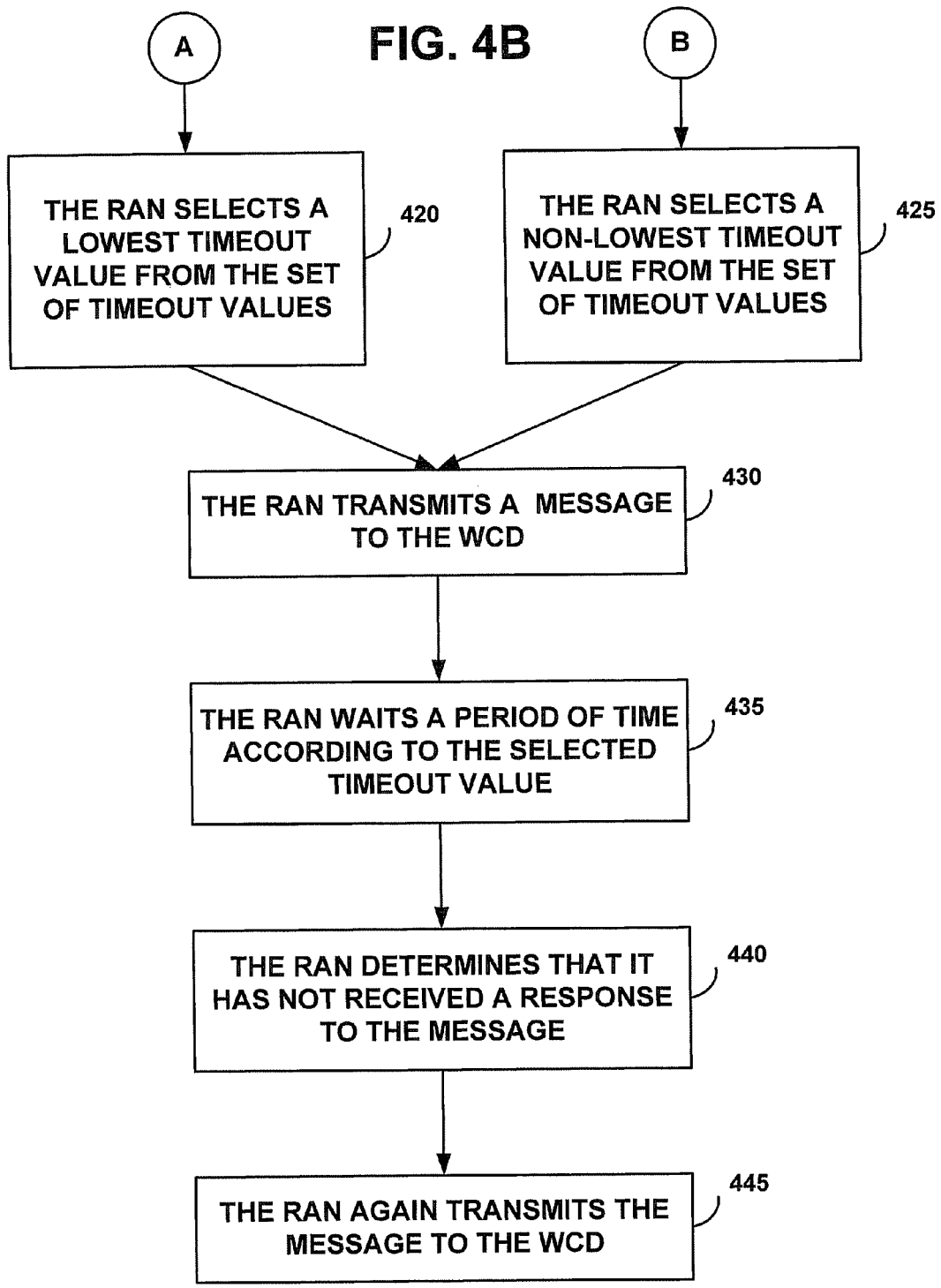

METHOD AND SYSTEM FOR REDUCING COMMUNICATION SESSION ESTABLISHMENT LATENCY

BACKGROUND

In a wireless communication system, a radio access network (RAN) usually comprises at least one mobile switching center (MSC), base station controller (BSC), and base transceiver system (BTS). Each BTS may radiate to define wireless coverage areas that serve wireless communication devices (WCDs) such as cell phones.

The air interface between a BTS and a WCD comprises one or more traffic channels that may support circuit-switched or packet-switched communication, or bearer traffic, between these devices. The needs of different types of applications may be best served by different types of traffic channels. For example, a voice over Internet Protocol (VoIP) application may require a low-latency traffic channel, while a web application may perform well on a best-effort traffic channel.

When idle, a WCD typically relinquishes some or all of its traffic channels, so that the RAN can allocate these channels to other WCDs. However, even a WCD that is not idle may not be allocated an appropriate type of traffic channel for a particular application. For example, suppose that a WCD is allocated one or more best-effort traffic channels for web browsing. If the WCD then originates or receives a voice call, the RAN will still have to allocate, for the WCD, at least one low-latency traffic channel to appropriately support the voice call. Thus, regardless of whether a WCD is idle or active, the RAN may need to allocate a traffic channel when the WCD becomes involved in a new communication session.

The type of traffic channel that the RAN allocates for given communication session is usually governed by a service option transmitted to the RAN by the WCD as part of communication session establishment. Service options may take the form of an integer that characterizes, among other things, the quality-of-service (QOS) requirements of a traffic channel.

The speed at which the RAN can allocate traffic channels for a WCD is a key performance metric of wireless services. For latency-sensitive applications, such as real-time voice, video, gaming, or various types of multi-media and media streaming applications, reducing the latency of communication session establishment even by just a few tens of milliseconds can have a noticeable, and positive, impact on user experience. Often, allocation of a traffic channel requires a RAN component to execute a channel allocation routine and to communicate information about the allocated channel to the WCD. The latter step may require transmitting one or more messages to, and receiving one or more messages from, the WCD.

As real-time applications become more prevalent in wireless communication systems, an operator of such a system may need to offer services with a QOS as good as, or better than, its competitors in order to grow both its subscriber base and its revenue. Thus, it is advantageous for an operator of a wireless communication system to take every reasonable opportunity to decrease the latency involved in communication session establishment.

Overview

In order to improve wireless communication system performance, methods and systems for reducing communication session establishment latency are introduced. In particular, these methods and systems decrease timers associated with retransmissions of communication session establishment messages in response to determining that the communication session being established is QOS-sensitive and the WCD that is attempting to establish the session has recently experienced poor wireless coverage quality. In this way, a RAN may establish communication sessions more rapidly.

In a preferred embodiment, a RAN is arranged to transmit a communication session establishment message in accordance with a timer. The RAN stores the timer with a default timeout value. The RAN also stores a threshold wireless coverage quality value, and a WCD periodically reports its observed wireless coverage quality.

The RAN then receives an indication that the WCD is attempting to establish a communication session. The WCD may be establishing the communication session in response to the WCD initiating the communication session, or the WCD may be establishing the communication session in response to another device initiating the communication session. In response to the indication, the RAN determines that the communication session is QOS-sensitive, and that the WCD recently reported a wireless coverage quality value less than the stored threshold wireless coverage quality value. These factors demonstrate that the WCD is attempting to be involved in a communication session, such as VoIP, that requires rapid establishment, but the WCD has recently experienced poor wireless coverage.

Accordingly, the RAN configures the stored timer with a second timeout value that is less than the default timeout value, and then transmits a communication session establishment message to the WCD. The RAN then waits for a period of time according to the timer. If, after this period of time, the RAN determines that it has not received a response to the communication session establishment message from the WCD, the RAN again transmits the message to the WCD. By proactively lowering the retransmission timer for a communication session establishment message when the WCD may be experiencing poor wireless coverage quality, the RAN retransmits potentially lost communication session establishment messages faster. Thus, if one or more of these messages are lost, the communication session is more likely to still be established in a timely manner.

Similarly, in another embodiment, the RAN maintains a set of timeout values. The RAN tests for the condition that (1) a WCD is attempting to establish a communication session, (2) the communication session is latency sensitive, and (3) the WCD has recently indicated that it is experiencing a wireless coverage quality less than a threshold wireless coverage quality value. If this condition is met, the RAN selects the lowest timeout value from the set of timeout values. If this condition is not met, the RAN selects a non-lowest timeout value from the set of timeout values.

Once a timeout value is selected, the RAN transmits a communication session establishment message to the WCD, and then waits a period of time according to the selected timeout value. If, after this period of time, the RAN determines that it has not received a response to the communication session establishment message from the WCD, the RAN again transmits the message to the WCD.

Applications that may benefit from the methods and systems introduced herein include QOS-sensitive applications, in particular latency-sensitive applications. These applications include circuit-switched voice calling, VoIP, push-to-talk (PTT), multi-media calling (e.g., voice, video, and/or data shared on a call between two or more participants), gaming, streaming audio, streaming video, and other types of applications now known or later developed. The benefits derived by these applications may also have a positive impact on the users of the applications, which in turn may benefit the operator of the wireless communication system.

These and other aspects and advantages will become apparent to those of ordinary skill in the art by reading the following detailed description, with reference where appropriate to the accompanying drawings. Further, it should be understood that the foregoing overview is merely exemplary and is not intended to limit the scope of the invention as claimed.

BRIEF DESCRIPTION OF THE DRAWINGS

FIG. 2A depicts a call flow in accordance with an exemplary embodiment;

FIG. 2B depicts another call flow in accordance with an exemplary embodiment;

DESCRIPTION

Disclosed herein are methods and systems for reducing communication session establishment latency. For purposes of illustration, the discussion below is directed to a Code Division Multiple Access (CDMA) RAN. It should be understood that any teachings herein may apply to other types of RANs and this illustration should not be construed as limiting the scope of the invention. Furthermore, this illustration should not be construed as limited to CDMA RANs, or any specific RAN configuration.

Furthermore, herein the term "communication session" is used to describe a discrete allocation of one or more traffic channels, and their subsequent use by a WCD. At any given time, a WCD may be allocated one or more groups of at least one traffic channel. However, even when a WCD is not allocated any traffic channels, the WCD may maintain an association with one or more wireless coverage areas, and may transmit and receive control and/or signaling traffic associated with these wireless coverage areas.

I. Network Architecture

Figure 1:
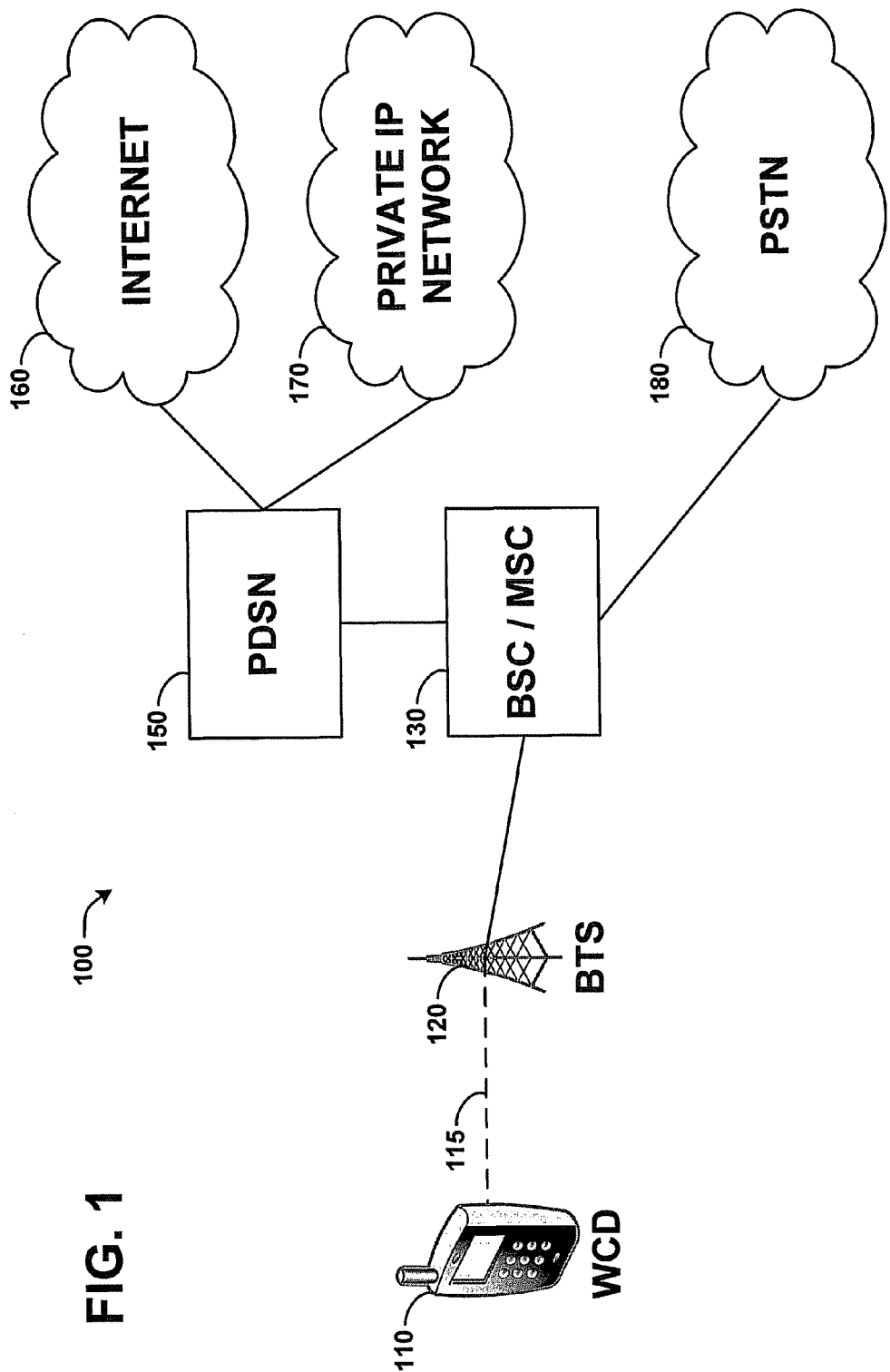
FIG. 1 is a block diagram of a communication network in accordance with an exemplary embodiment.

FIG. 1 is a simplified block diagram of an exemplary communication network 100, in which exemplary embodiments may be employed. Network 100 includes one or more WCDs 110, BTSs 120, base station controllers/mobile switching centers (BSC/MSC) 130, and packet data serving nodes (PDSNs) 150. BSC/MSC 130 may be coupled with a public switched telephone network (PSTN) 180. Furthermore, PDSN 150 may be coupled with an Internet 160 and at least one private Internet Protocol (IP) network 170.

The combination of network elements, including BTS 120 and BSC/MSC 130, may be collectively referred to as a RAN. PDSN 150 may be referred to as a core network element. However, PDSN 150 may be co-located with a RAN or combined into elements of a RAN. Furthermore, the elements of a RAN may be combined together or separated into fewer or more logically distinct or physically distinct elements than shown in FIG. 1. For example, BTS 120 may be combined into BSC/MSC 130, or BSC/MSC 130 may be separated into distinct BSC and MSC elements.

Regardless of the exact configuration of the elements in FIG. 1, the general purpose of these elements is to allow WCD 110 to participate in circuit-switched and packet-switched communications. Circuit-switched calls, such as those enabling traditional voice telephony services, may involve BSC 120 and BSC/MSC 130, and are preferably routed to or from PSTN 180. Packet-switched calls, also known as data calls, enable various communication services, such as voice over IP (VoIP), video over IP, push-to-talk (PTT), audio and video streaming, web surfing, as well as other types of IP services. These calls may involve BTS 120, BSC/MSC 130, and PDSN 150, and are preferably routed to or from either Internet 160, private IP network 170, or both.

It should be understood, however, that this and other arrangements described herein are set forth for purposes of example only. As such, those skilled in the art will appreciate that other arrangements and other elements (e.g., machines, interfaces, functions, orders of functions, etc.) can be used instead, and some elements may be omitted altogether. Further, as in most telecommunications applications, those skilled in the art will appreciate that many of the elements described herein are functional entities that may be implemented as discrete or distributed components or in conjunction with other components, and in any suitable combination and location.

Thus, communication network 100 may include more or fewer elements than shown in FIG. 1, and these elements may be arranged differently. Also, each of these elements may include at a central processing unit (CPU), a memory, input/output peripherals, and a wireline or wireless network interface. The characteristics and functions of each of these elements are described at a high level in the following subsections. However, the descriptions in these subsections are merely introductory and should not be interpreted to limit the characteristics and functions of these elements.

a. BTS

BTS 120 radiates to define wireless coverage areas. Each wireless coverage area may provide air interface access to WCD 110 and any other WCD served by the wireless coverage area. A single BTS may define one or more wireless coverage areas. The air interface 115 of these wireless coverage areas may include forward links for transmitting information from BTS 120 to WCD 110 (in the forward direction) and reverse links for transmitting information from WCD 110 to BTS 120 (in the reverse direction). Through the forward and reverse links, BTS 120 and WCD 110 exchange signaling traffic, as well as bearer traffic, such as voice, data, video, or other media. Although FIG. 1 shows only one BTS 120, network 100 may include more BTSs.

b. WCD

WCD 110 could be a wireless telephone, a wireless personal digital assistant, a wirelessly equipped laptop computer, a wireless router, or another type of mobile or fixed wireless device. Preferably, a WCD is a subscriber device, which is manipulated by a human in order to establish circuit-switched or packet-switched voice and/or data calls into the RAN and core network. However WCD 110 could also be an automated device without a human interface. Typically, WCD 110 is associated with one or more BTSs 120 at a time and uses the wireless coverage areas of these BTSs to communicate with correspondent nodes, such as web servers, gaming servers, VoIP signaling proxies, VoIP bearer gateways, and other WCDs. WCD 110 may also be able to transfer ongoing communication sessions from one BTS 120 to another in a handoff process.

WCD 110 may, from time to time, measure the quality of its wireless coverage by preferably listening to a forward direction channel, such as a pilot channel. The WCD may calculate the channel's signal-to-noise ratio as the received pilot channel energy (denoted Ec) to the total received energy (denoted Io). The result, Ec/Io, is expressed in decibels (dB), and typically falls within the range of 0.0 dB (excellent wireless coverage) to (−16.0 dB) very poor wireless coverage. However, Ec/Io values less than −16.0 are possible. Alternatively, Ec/Io may be referred to as C/I, the carrier-to-interference ratio of the forward direction channel. Furthermore, other methods of measuring a forward direction channel's signal-to-noise ratio may be used.

Once Ec/Io, or another estimate of wireless coverage quality, is determined, the WCD may transmit this estimate to the RAN (for example, in a pilot strength measurement message (PSMM) or a resource utilization message (RUM)), or the WCD may use the estimate to recommend to the RAN a forward direction data rate that the WCD may be able to receive. Typically, a WCD will attempt to recommend the highest forward direction data rate that the WCD estimates that it can receive such that its received frame error rate is reasonably low (e.g., less than 3%). The WCD preferably transmits this information to the RAN on a data rate control (DRC) channel as an integer. Exemplary DRC values are shown in Table 1.

TABLE 1

Exemplary DRC values and associated data rates.

| DRC Value | Data rate (kilobits per second) |
|---|---|
| 1 | 38.4 |
| 2 | 76.8 |
| 3 | 153.6 |
| 4/5 | 307.2 |
| 6/7 | 614.4 |
| 8 | 921.6 |
| 9/10 | 1228.8 |
| 11 | 1843.2 |
| 12 | 2457.6 |
| 13 | 1536 |
| 14 | 3072 |

The WCD may transmit a DRC value to the RAN periodically, according to a static or dynamic schedule, randomly, or in response to a trigger that is internal or external to the WCD. Upon receiving a DRC value from a WCD, the RAN may select the data rate associated with the DRC value. Alternatively, the RAN may select a higher or lower data rate based on RAN configuration or policy. The RAN may then modulate a forward direction traffic channel such that the selected data rate is supported. During the period in which a forward direction traffic channel is allocated to a WCD, the WCD may continue transmitting DRC values to the RAN and the RAN may responsively adjust the data rate of the forward direction traffic channel.

c. BSC/MSC

BSC/MSC 130 comprises two logical elements, a BSC and an MSC, which are combined in FIG. 1 for purposes of simplicity. In a deployment of network 100, the BSC and MSC may be separate physical devices or may be software or hardware components on the same physical device.

A BSC portion of BSC/MSC 130 may control multiple BTSs 120 by determining how each BTS 120 manages the WCDs, such as WCD 110, in the BTS's wireless coverage areas. For example, a BSC may instruct a BTS 120 to assign wireless channels to a WCD, increase or decrease power to a WCD, or handoff a WCD to a different BTS. Voice and data traffic to and from each WCD typically flows through a BSC. Preferably, the BSC routes circuit-switched communications to an MSC element, and packet-switched communications to PDSN 150. The functions performed by the BSC may also be performed by a similar RAN device such as a Radio Network Controller (RNC).

An MSC portion of BSC/MSC 130 performs many of the functions of a Class 5 telephony switch, but with additional functionality to manage the mobility of subscriber devices, such as WCD 110. For example, an MSC may comprise a visitor location register (VLR) and a home location register (HLR). Alternatively, the VLR and HLR functions may be located in a more centralized fashion and not associated solely with any one MSC. The MSC may be responsible for switching functions, media transport functions, transcoding functions, short message service (SMS) functions, and managing the communications between WCD 110 and the PSTN 180.

In a preferred arrangement, a wireless network comprises multiple MSCs. Each WCD that subscribes to the wireless network is assigned to a home MSC. An HLR may maintain a profile for the WCD. When the WCD roams to a wireless coverage area managed by a different MSC, the WCD is considered to be roaming to a visited MSC. Accordingly, a VLR, which may be associated with the visited MSC, may acquire a copy of the WCD's profile from the HLR. Alternatively, the VLR may acquire a copy of only a subset of the WCD's profile or a reference to the WCD's profile at the HLR.

However, with the emergence of data-only networks that use an IP Multimedia Subsystem, MSCs may be enhanced or replaced by other devices. In these networks, the functions of the MSC may be distributed amongst BSCs, and one or more media gateways, media gateway controllers, signaling gateways, call control session functions, application servers, policy servers, and so on.

Regardless of its exact implementation, BSC/MSC 130 may maintain a threshold wireless coverage quality level, preferably expressed in terms of a DRC value. If a WCD reports a measured DRC value less than this threshold DRC value, BSC/MSC 130 may consider the WCD to be experiencing poor wireless coverage, and as a result may take steps to accommodate for this perceived deficiency.

Alternatively, BSC/MSC 130 may maintain a threshold wireless coverage quality level, preferably expressed in terms of a signal-to-noise ratio. If a WCD reports a measured signal-to-noise ratio lower than this threshold, for example in a PSMM, BSC/MSC 130 may consider the WCD to be experiencing poor wireless coverage, and as a result may take steps to accommodate for this perceived deficiency.

As another alternative, a WCD, such as WCD 110, may transmit a RUM to BSC/MSC 130 indicating that it is not receiving information on forward direction channels at an expected level of service. Accordingly, BSC/MSC 130 may consider the WCD to be experiencing poor wireless coverage, and as a result may take steps to accommodate for this perceived deficiency.

Of course, other means for measuring wireless coverage quality levels at a WCD may be used. Additionally, other means for reporting these measurements, or an indication of these measurements, to the RAN may also be used.

d. PDSN

A PDSN 150 may be a router-like device that manages the connectivity of WCDs, such as WCD 110, to a packet-switched network. A PDSN 150 preferably serves tens, hundreds or thousands of WCDs via point to point protocol (PPP)

links to each WCD. However, a PPP link to a WCD is not required for a PDSN 150 to serve a WCD. A PDSN 150 may also authenticate WCDs, or, in conjunction with a AAA server (not shown), facilitate authentication of WCDs. Once a WCD is authenticated, its serving PDSN 150 will grant the WCD access to Internet 160 and/or public IP network 170.

II. Exemplary Embodiments

The following embodiments involve a WCD, such as WCD 110, and the RAN and core network elements described above. However, other RAN and core network elements can be used without departing from the scope of these embodiments. Furthermore, these embodiments depict respective sequences of steps occurring between a WCD and the RAN to establish a communication session. However, each respective sequence of steps may occur in a different order, and fewer or more steps may be used without departing from the scope of the embodiments.

In FIG. 2A, call flow 200 involves WCD 110, RAN 210 (preferably comprising BTS 120 and BSC/MSC 130), and PDSN 150. At step 225, WCD 110 transmits a DRC value to RAN 210. This DRC value is preferably chosen from those listed in Table 1, and is preferably based on signal-to-noise ratio calculations performed at WCD 110. WCD 110 may transmit such a DRC value to RAN 210 on a regular basis, according to a static or dynamic schedule, in response to receiving a signal from RAN 210, in response to a measured change in wireless coverage quality, randomly, or due to some other input or for some other reason. RAN 210 may store at least the latest DRC value received from each WCD. Alternatively, WCD 110 may instead transmit a PSMM or RUM to BSC/MSC 130.

At step 230, WCD 110 transmits a connection request message to RAN 210. This message notifies RAN 210 that WCD 110 is requesting a traffic channel assignment. At step 235, RAN 210 preferably responds by transmitting a traffic channel assignment message to WCD 110. At step 240, WCD 110 responds to the traffic channel assignment message with a reverse traffic channel (RTC) acquired message. At step 245, RAN 210 transmits an RTC acknowledgement (ACK) message to WCD 110.

If WCD 110 is experiencing poor wireless coverage quality, it is possible that at least the RTC ACK message, as shown in step 245, may not reach WCD 110. Alternatively, the RTC ACK message may reach WCD 110, but the traffic channel complete message that, at step 260, WCD 110 transmits in response to the RTC ACK, message may be lost. In either case, until RAN 210 receives a traffic channel complete message, RAN 210 will not open a connection between WCD 110 and PDSN 150 and therefore WCD 110 will not be able to access Internet 160 or private IP network 170.

In order to accommodate the possibility that the RTC ACK message or an associated traffic channel complete message is lost, at step 250, RAN 210 sets a timer for the RTC ACK message transmitted at step 245. If the timer expires before RAN 210 receives a traffic channel complete message, RAN 210 will retransmit the RTC ACK message. Such a retransmission is shown at step 255. While FIG. 2A depicts RAN 210 receiving a traffic channel complete message from WCD 110 at step 260, RAN 210 may have to retransmit an RTC ACK message multiple times before receiving a traffic channel complete message. In some cases, RAN 210 will retransmit an RTC ACK message a given number of times, and then give up, at least for a while, as WCD 110 is likely not receiving the messages due to being out of coverage.

The value of the timer used at step 250 may vary based on the type of communication session being established. For example, if WCD 110 is attempting to establish a QOS-sensitive communication session, as RAN 210 may determine from a service option associated with the communication session for instance, then RAN 210 may use a lower value for the timer. However, if WCD is attempting to establish a best-effort or an otherwise non-QOS-sensitive communication session, then RAN 210 may use a higher value for the timer. RAN 210 may determine the type of communication session that WCD 110 is attempting to establish from a service option transmitted by WCD 110.

For instance, if WCD 110 is originating a VoIP call, it may request a low latency traffic channel by transmitting an appropriate service option in a communication session establishment message, such as the connection request message transmitted in step 230, to RAN 210. RAN 210, from the service option, may determine that the communication session being established is QOS-sensitive (in particular, latency-sensitive). Accordingly, the RAN selects a low timeout value for at least one communication session establishment message it transmits to WCD 110.

The value of the timer used at step 250 may also vary based on the network conditions. In another example, if WCD 110 has recently reported a DRC value lower than a threshold DRC value maintained at RAN 210, then RAN 210 may use a lower value for the timer. If WCD 110 has recently reported a DRC at or higher than the threshold DRC value, then RAN 210 may use a higher value for the timer. An exemplary threshold DRC value may be 3; however, RAN 210 may be configured with a different threshold DRC value.

Thus, RAN 210 may select and use a lower retransmission timeout value in response to the QOS-sensitivity of a communication session being established by WCD 110, and a recently-received report of wireless coverage quality at WCD 110. Furthermore, the timeout value is preferably set to be between 50 and 250 milliseconds, inclusive. However, higher or lower timeout values may be used.

Assuming that RAN 210 does receive a traffic channel complete message at step 260, then at step 265, RAN 210 will open a connection between WCD 110 and PDSN 150, allowing data to flow between these devices. Accordingly, at step 270, WCD 110 and PDSN 150 may exchange PPP traffic associated with the new communication session just established at WCD 110. Alternatively, non-PPP framing may be used for traffic transmitted between WCD 110 and PDSN 150.

FIG. 2B depicts a call flow 280 directed a similar scenario as FIG. 2A, but focuses on the timeout and retransmission of a communication session establishment message from a RAN to a WCD. At step 282, WCD 110 transmits an indication of poor wireless coverage quality to RAN 210. This indication may be an estimate of a forward direction data rate that the WCD may be able to receive, such as a DRC value. Alternatively, this indication may be of a measured forward direction signal-to-noise ratio, or some other means for reporting wireless coverage quality, such as a PSMM or an RUM.

At step 284, which may occur some period of time after step 282, RAN 210 transmits a communication session establishment message to WCD 110. This communication session establishment message is either lost, dropped by WCD 110, or otherwise fails to be properly received by WCD 110. Alternatively, the communication session establishment message may reach WCD 110, but WCD 110 may fail to transmit an appropriate acknowledgement, or WCD 110 may transmit an appropriate acknowledgement, but this acknowledgement may be lost or otherwise fail to be properly received by RAN 210.

In order to recover from any of these failures, or other possible failures associated with step 284, RAN 210 sets a timer for the communication session establishment message at step 286. The value of the timer used at step 286 may vary based on the type of communication session being established. For example, if WCD 110 is attempting to establish a QOS-sensitive communication session, then RAN 210 may use a lower value for the timer. However, if WCD 110 is attempting to establish a best-effort or an otherwise non-QOS-sensitive communication session, then RAN 210 may use a higher value for the timer. RAN 210 may determine the type of communication session that WCD 110 is attempting to establish from a service option transmitted by WCD 110.

Regardless of how the value of the timer is determined, if the timer expires before RAN 210 receives an associated acknowledgement message, RAN 210 may retransmit the communication session establishment message at step 288. RAN 210 may retransmit the communication session establishment message a number of times before the communication session establishment message is successfully acknowledged, or RAN 210 gives up trying to transmit it, at least for a while.

At step 290, WCD 110 transmits an acknowledgement message, acknowledging the successful receipt of the communication session establishment message. Upon receiving this acknowledgement message, RAN 210 preferably disables the timer associated with the communication session establishment message and no longer retransmits the communication session establishment message.

Call flow 280 may be applied to circuit-switched or packet-switched session establishment. Furthermore, for packet-switched session establishment, call flow 280 may be applied to establishing sessions for voice, video, multimedia, data, or other applications.

As described previously, a RAN may decrease a timer associated with a communication session establishment message transmitted to a WCD if the RAN determines that the WCD is attempting to establish a QOS-sensitive communication session or the WCD has recently reported poor wireless coverage quality. The following methods describe this process in more detail.

Each of the methods described below are for purposes of example. In each method, more or fewer steps may be used, and the steps may be carried out in a different order than is illustrated below. Additionally, these methods may be combined with one another in multiple arrangements. However, preferred embodiments are not limited to these methods or any combination of these methods. Furthermore, while certain steps of these methods are described below as being carried out by a particular device or element, these steps may be carried out by other devices or elements.

Figure 3B:
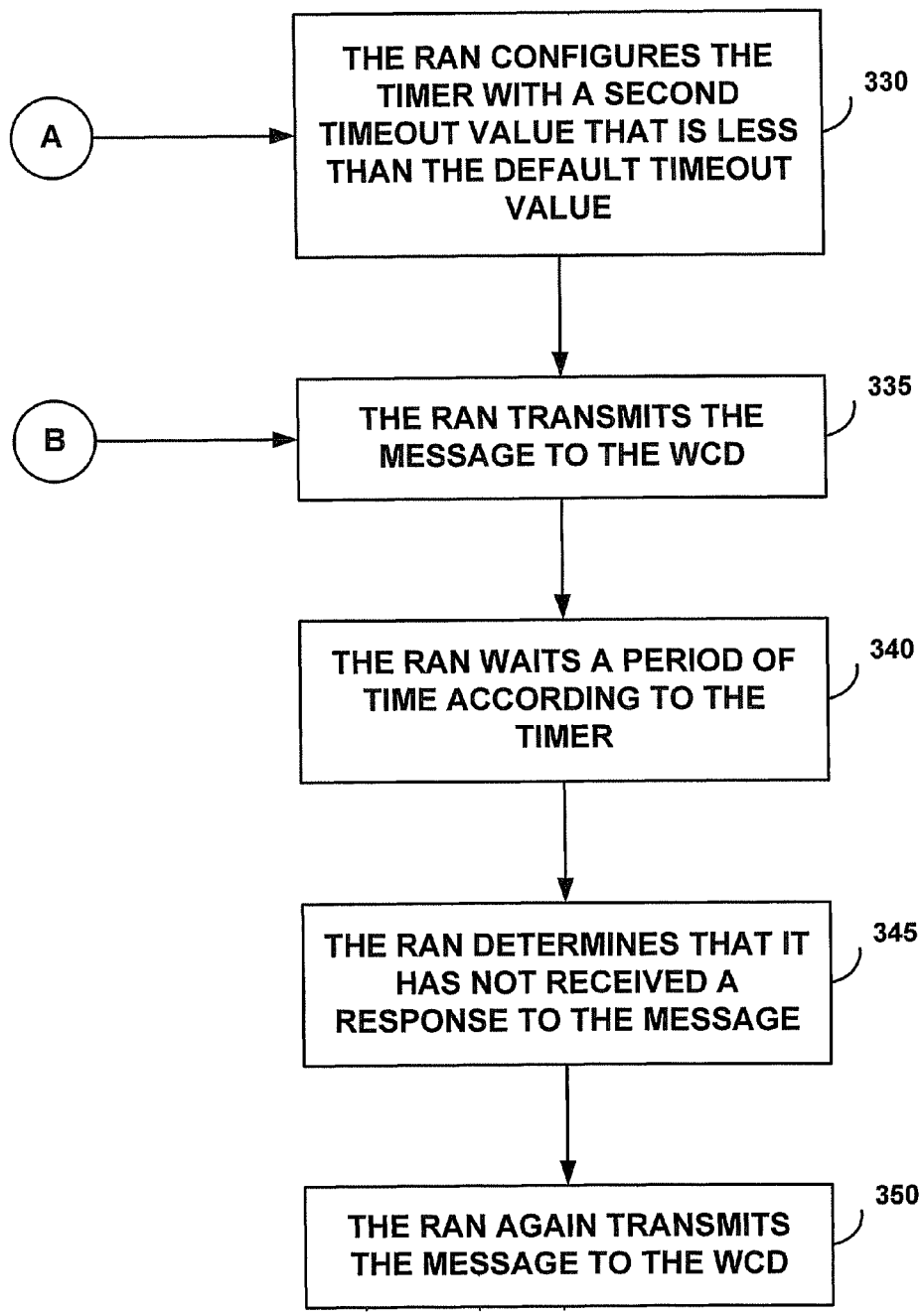
FIG. 3 depicts a method in accordance with an exemplary embodiment.

FIG. 3 depicts method 300 for reducing communication session establishment latency. At step 310, a RAN, such as RAN 210, stores a timer with a default timeout value. This default timeout value may be configured to be appropriate for use as a timeout value associated with communication session establishment messages transmitted to a WCD, in scenarios where the WCD has indicated a reasonable wireless coverage quality. Also at step 310, the RAN maintains a threshold wireless coverage quality value. WCDs experiencing a wireless coverage quality lower than this threshold may be considered to have poor wireless coverage quality, while WCDs experiencing a wireless coverage quality at or higher than this threshold may be considered to have at least reasonable wireless coverage quality.

At step 320, the RAN receives an indication that a WCD is attempting to establish a communication session. In order to determine whether to adjust the value of the timer stored in step 310, the RAN, at step 325, determines if the communication session is QOS-sensitive and if a recent wireless coverage quality value received from the WCD is less than the threshold wireless coverage quality value. The RAN may determine the QOS-sensitivity of the communication session from a service option associated with the communication session, and the RAN may determine the recent wireless coverage quality experienced by the WCD from a DRC value recently reported by the WCD. Alternatively, RAN may determine the recent wireless coverage quality experienced by the WCD from an indication of signal-to-noise ratio recently reported by the WCD, or the RAN may make this determination based on other factors.

If both of these conditions are met, then the RAN, at step 330, configures the timer with a second (i.e., different) timeout value that is less than the default timeout value. Then, at step 335, the RAN transmits a communication session establishment message, such as an RTC ACK message, to the WCD. At step 340, the RAN waits a period of time according to the timer, in order to receive a response, such as a traffic channel complete message, to the communication session establishment message that the RAN transmitted. At step 345, the RAN determines that it has not received a response to the communication session establishment message, and at step 350 the RAN retransmits the communication session establishment message to the WCD.

Figure 4A:
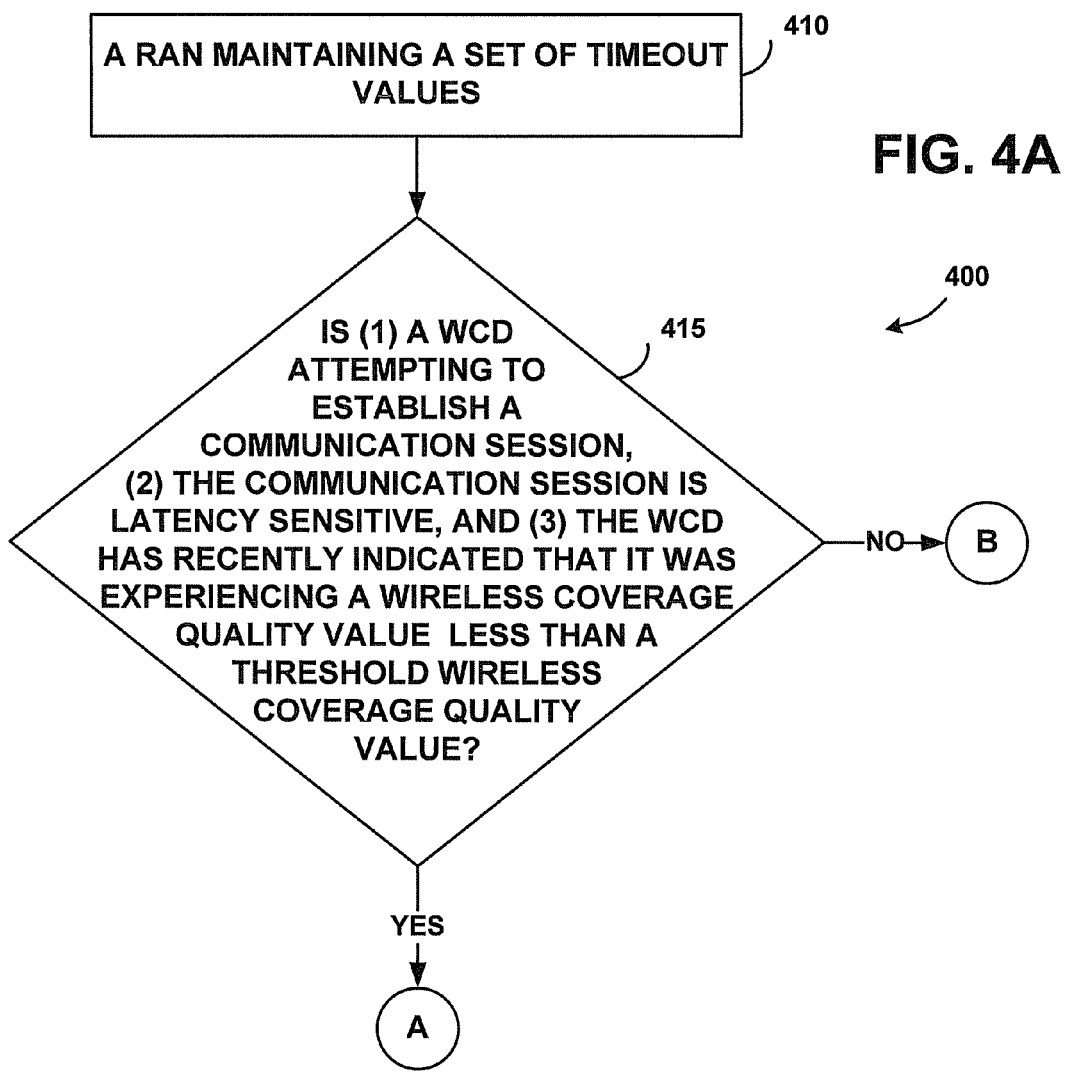
FIG. 4 depicts another method in accordance with an exemplary embodiment.

FIG. 4 depicts another method 400 for reducing communication session establishment latency. At step 410, a RAN, such as RAN 210, maintains a set of timeout values. Preferably this set contains two or more different timeout values, and these timeout values may be arranged in order from lowest to highest timeout value. At step 415, the RAN tests for the condition that (1) a WCD is attempting to establish a communication session, (2) the communication session is latency sensitive, and (3) the WCD has recently indicated that it was experiencing a wireless coverage quality less than a threshold wireless coverage quality. Similar to the discussion above, the RAN may determine that a communication session is latency sensitive from a service option associated with the communication session, and the WCD may indicate its recently experienced wireless coverage quality in a DRC message. Alternatively, RAN may determine the recent wireless coverage quality experienced by the WCD from an indication of signal-to-noise ratio recently reported by the WCD. However, the RAN may make this determination based on other factors.

If the condition is met, then, in step 420, the RAN selects a lowest timeout value from the set of timeout values to use with at least one communication session establishment message it transmits to the WCD. If the condition is not met, the RAN selects a non-lowest timeout value from the set of timeout values to use with at least one communication session establishment message it transmits to the WCD.

Accordingly, at step 430, the RAN transmits a communication session establishment message to the WCD. At step 435, the RAN waits a period of time corresponding to the selected timeout value. If, at step 440, the RAN determines that it has not received a response to the communication session establishment message during this period of time, then, at step 445, the RAN again transmits the communication session establishment message to the WCD.

III. Example RAN Element

Figure 5:
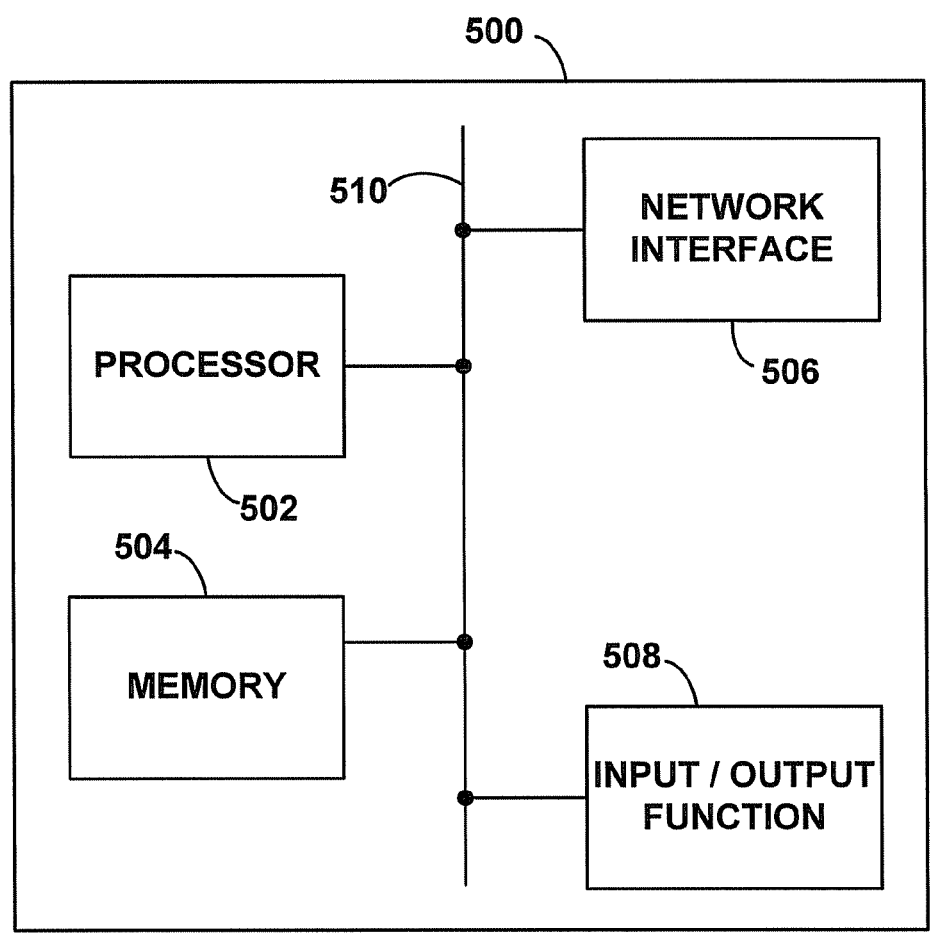
FIG. 5 depicts an exemplary implementation of a RAN element arranged to support the embodiments described herein.

FIG. 5 is a simplified block diagram of an example RAN element 500, illustrating some of the functional components that would likely be found in a RAN element arranged to operate in accordance with the embodiments herein. Example RAN element 500 could be a device in the RAN, such as BTS 120, BSC/MSC 130, or any other device that performs communication session establishment functions. However, example RAN element 500 can take other forms as well. Example RAN element 500 preferably includes a processor 502, a memory 504, a network interface 506, and an input/output function 508, all of which may be coupled by a system bus 510 or a similar mechanism.

Processor 502 preferably includes one or more CPUs, such as one or more general purpose processors and/or one or more dedicated processors (e.g., application specific integrated circuits (ASICs) or digital signal processors (DSPs), etc.) Memory 504, in turn, may comprise volatile and/or non-volatile memory and can be integrated in whole or in part with processor 502. Memory 504 preferably holds program instructions executable by processor 502, and data that is manipulated by these instructions, to carry out various logic functions described herein. (Alternatively, the logic functions can be defined by hardware, firmware, and/or any combination of hardware, firmware and software.)

Network interface 506 may take the form of a wireline connection, such as an Ethernet, Token Ring, or T1 carrier connection. Network interface 506 may also take the form of a wireless connection, such as IEEE 802.11 (Wifi), BLUETOOTH, or an interface used to communicate with WCDs. However, other forms of physical layer connections and other types of standard or proprietary communication protocols may be used over network interface 506.

Input/output function 508 facilitates user interaction with example RAN element 500. Input/output function 508 may comprise multiple types of input devices, such as a keyboard, a mouse, a touch screen, and so on. Similarly, input/output function 508 may comprise multiple types of output devices, such as a monitor, printer, or one or more light emitting diodes (LEDs). Additionally or alternatively, example RAN element 500 may support remote access from another device, via network interface 506 or via another interface (not shown), such an RS-232 port.

By way of example, the data in memory 504 will preferably contain information associated with WCDs, such as WCD 110, served by the RAN's wireless coverage area(s). This information may include identifiers of the WCDs, such as the WCDs' International Mobile Subscriber Identities, Electronic Serial Numbers, and so on. Memory 504 may also contain a timer, configured with a pre-determined default value, for use with a communication session establishment message that RAN element 500 transmits to a WCD during establishment of a communication session. Furthermore, memory 504 may maintain a threshold wireless coverage quality, as well as a number of recent wireless coverage quality measurements received from the WCD.

Memory 504 may further comprise stored program instructions that are executable by processor 502 to receive an indication that the WCD is attempting to establish the communication session, and, responsive to the indication, determine that (i) the communication session is quality-of-service sensitive, and (ii) a recent wireless coverage quality value received from the WCD is less than the threshold wireless coverage quality value. Memory 504 may also comprise stored program instructions that are executable by processor 502 to, in response to the determining, configure the timer with a second value, wherein the second value is less than the pre-determined default timeout value. Moreover, memory 504 may comprise stored program instructions that are executable by processor 502 to (i) transmit the message to the WCD, (ii) after transmitting the message, wait a period of time according to the timer, (iii) after waiting the period of time, determine that the RAN has not received a response to the message, and (iv) in response to the determination, again transmit the message to the WCD.

In another example, the data in memory 504 will again preferably contain information associated with WCDs, such as WCD 110, served by the RAN's wireless coverage areas. This information may include identifiers of the WCDs, such as the WCDs' International Mobile Subscriber Identities, Electronic Serial Numbers, and so on. Memory 504 may also maintain a set of timeout values.

Memory 504 may further comprise stored program instructions that are executable by processor 502 for testing a condition that (i) the WCD is attempting to establish a communication session, (ii) the communication session is latency-sensitive, and (iii) the WCD has recently indicated that the WCD is experiencing a wireless coverage quality below that of a predefined threshold wireless coverage quality. Memory 504 may also comprise stored program instructions that are executable by processor 502 to select, if the condition is met, a lowest timeout value from the set of timeout values, and stored program instructions to select, if the condition is not met, a non-lowest timeout value from the set of timeout values.

Finally, and as described above, memory 504 may additionally comprise stored program instructions that are executable by processor 502 for, in response to the selecting, (i) transmitting a message to the WCD, (ii) waiting a period of time according to the selected timeout value, (iii) determining that the RAN has not received a response to the message, and (iv) again transmitting the message to the WCD.

The program instructions stored in memory 504 described above are exemplary and not intended to be a complete description of the functions stored in memory 504, or of the functions supported by RAN element 500. RAN element 500 may support other functions related to performing tasks associated with RAN procedures, and these additional functions are preferably encoded as program instructions and stored in memory 504.

IV. Conclusion

Exemplary embodiments have been described above. Those skilled in the art will understand, however, that changes and modifications may be made to these embodiments without departing from the true scope and spirit of the invention, which is defined by the claims.

What is claimed is:

1. A method for reducing communication session establishment latency, wherein a radio access network (RAN) defines at least one wireless coverage area, wherein a wireless communication device (WCD) is served by the at least one wireless coverage area, wherein the WCD, from time to time, transmits to the RAN a wireless coverage quality value as measured at the WCD, wherein the RAN stores a timer to use with a message that the RAN transmits to the WCD during establishment of a communication session, and wherein the timer is configured with a pre-determined default value, the method comprising:

the RAN maintaining a threshold wireless coverage quality value, the RAN receiving an indication that the WCD is attempting to establish the communication session;

responsive to receiving the indication, the RAN determining that (i) the communication session is quality-of-service sensitive, and (ii) a recent wireless coverage quality value received from the WCD is less than that of the threshold wireless coverage quality value;

responsive to the determining, the RAN configuring the timer with a second value, wherein the second value is less than the pre-determined default value; and during establishment of the communication session to the WCD, the RAN (i) transmitting the message to the WCD, (ii) waiting a period of time according to the timer, (iii) determining that the RAN has not received a response to the message, and (iv) again transmitting the message to the WCD.

2. The method of claim 1, wherein the quality-of-service sensitivity of the communication session is latency sensitivity.

3. The method of claim 2 wherein the communication session is a voice call.

4. The method of claim 2, wherein the communication session is a push to talk call.

5. The method of claim 2, wherein the communication session is a multi-media call.

6. The method of claim 1, wherein the second timeout value is within the range of 50 milliseconds to 250 milliseconds.

7. The method of claim 1, wherein the wireless coverage quality value is a Data Rate Control (DRC) value.

8. The method of claim 7, wherein the threshold wireless coverage quality value is a DRC value of 3.

9. The method of claim 7, further comprising:
the WCD determining the DRC value by calculating the signal-to-noise ratio of at least one forward-link channel between the RAN and the WCD.

10. The method of claim 1, wherein the message that the RAN transmits to the WCD is a Reverse Traffic Channel (RTC) acknowledgement message.

11. A method for reducing communication session establishment latency, wherein a radio access network (RAN) defines at least one wireless coverage area, wherein a wireless communication device (WCD) is served by the at least one wireless coverage area, the method comprising:

maintaining, at the RAN, a set of timeout values;

testing, at the RAN, for a condition that (i) the WCD is attempting to establish a communication session, (ii) the communication session is latency-sensitive, and (iii) the WCD has recently indicated that the WCD is experiencing a wireless coverage quality below that of a pre-defined threshold wireless coverage quality;

if the condition is met, the RAN selecting a lowest timeout value from the set of timeout values;

if the condition is not met, the RAN selecting a non-lowest timeout value from the set of timeout values;

in response to the selecting, during establishment of the communication session to the WCD, the RAN: (i) transmitting a message to the WCD, (ii) waiting a period of time according to the selected timeout value, (iii) determining that the RAN has not received a response to the message, and (iv) again transmitting the message to the WCD.

12. The method of claim 11, wherein the wireless coverage quality indication is a Data Rate Control (DRC) indication, wherein the value of the DRC indication is determined by the WCD calculating the signal-to-noise ratio of a forward-link channel between the RAN and the WCD.

13. The method of claim 11, wherein the message is a communication session establishment message.

14. The method of claim 13, wherein the communication session establishment message is a Reverse Traffic Channel (RTC) acknowledgement message.

15. A radio access network (RAN) comprising:
an antenna that radiates to define at least one wireless coverage area, the at least one wireless coverage area serving a wireless communication device (WCD);

a memory that stores: (i) a threshold wireless coverage quality value, (ii) a timer to use with a message that the RAN transmits during establishment of a communication session to the WCD, wherein the timer is configured with a pre-determined default timeout value, and (iii) program instructions; and a central processing unit (CPU) capable of executing the program instructions stored in the memory to:
receive an indication that the WCD is attempting to establish the communication session;

responsive to the indication, determine that (i) the communication session is quality-of-service sensitive, and (ii) a recent wireless coverage quality value received from the WCD is less than the threshold wireless coverage quality value;

responsive to the determining, configure the timer with a second value, wherein the second value is less than the pre-determined default timeout value;

during establishment of the communication session to the WCD, transmit the message to the WCD;

after transmitting the message, wait a period of time according to the timer;

after waiting the period of time, determine that the RAN has not received a response to the message; and in response to the determination, again transmit the message to the WCD.

16. The RAN of claim 15, wherein the communication session is latency sensitive.

17. The RAN of claim 15, wherein the second timeout value is within the range of 50 milliseconds to 250 milliseconds.

18. The RAN of claim 15, wherein the threshold wireless coverage quality is a Data Rate Control (DRC) value.

19. The RAN of claim 18, wherein the threshold wireless coverage quality value is a DRC value of 3.

20. The RAN of claim 15, wherein the message that the RAN transmits to the WCD is a Reverse Traffic Channel (RTC) acknowledgement message.

* * * * *